June 8, 1926.
I. DICKEY ET AL
TIRE TOOL
Original Filed July 10, 1924
1,587,634
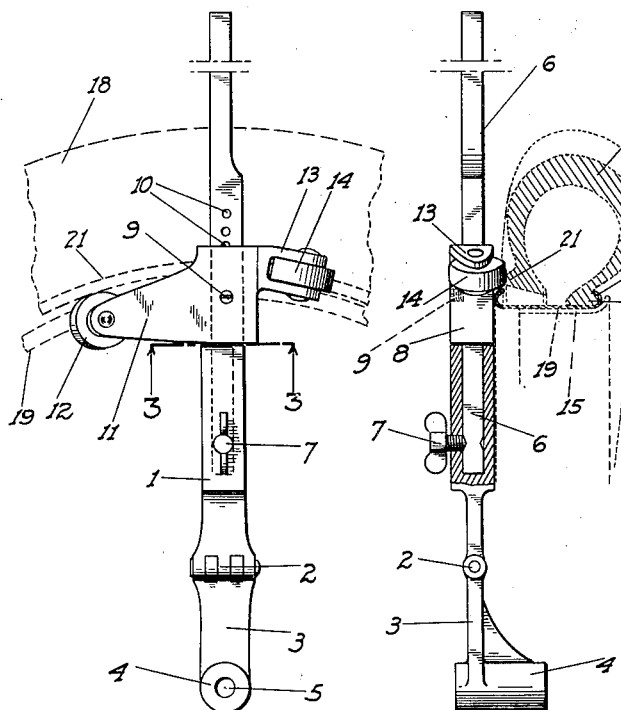
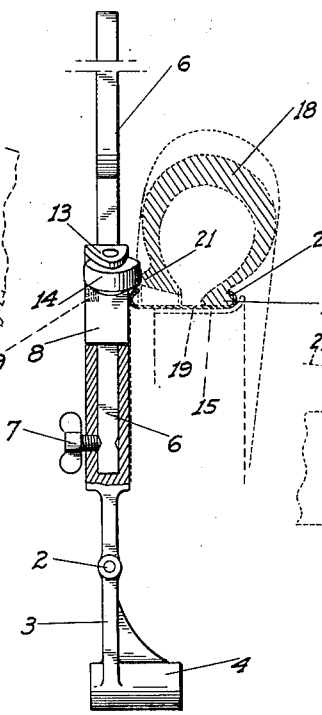
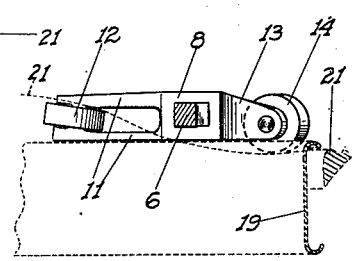
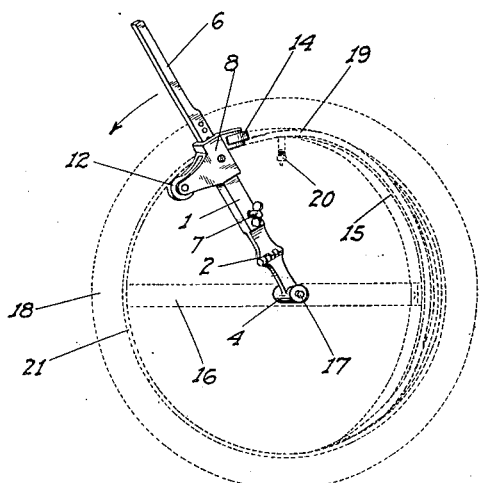
INVENTORS
Ion Dickey and
William E. McCown
BY
ATTORNEY Patented June 8, 1926.

1,587,634

UNITED STATES PATENT OFFICE.

ION DICKEY AND WILLIAM E. McCOWN, OF STOCKTON, CALIFORNIA.

TIRE TOOL.

Application filed July 10, 1924, Serial No. 725,156. Renewed March 2, 1926.

This invention relates to tire tools for use in connection with pneumatic automobile tires, and especially to such tires as are known as the clincher or similar type which are mounted on a continuous uncut rim.

Those who have had occasion to mount such tires on their rims with the ordinary tire irons and similar implements realize what an irksome and difficult job it is to expand the tire so that the tire beads may enter and seat in the curled edges of the rim, and the principal object of our invention is to provide a tool for this operation so constructed that the tire is expanded to clear the rim, and one bead of the tire is simultaneously pressed below the curl of the rim so as to allow the tire-bead to spring into the same. Means are also provided for temporarily mounting the tool in connection with the tire and rim in such a manner that the complete tire mounting operation can be easily performed in but a minute or so, and without any expert knowledge or experience being necessary.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views:

Fig. 1 is a top-plan view of the tool in operation.

Fig. 2 is a side view of the same, partly in section.

Fig. 3 is a cross section on the line 3—3 of Fig. 1.

Fig. 4 is a perspective assembly of the tool in connection with a tire and rim, with the tool in its initial operating position.

Referring now more particularly to the characters of reference on the drawings, the numeral 1 denotes a socket member having a hinged connection as at 2 beyond its inner and closed end with a flat bar 3, on the outer end of which is a boss 4 provided with an orifice 5 therethrough whose axis is at right angles to the axis of the hinge 2. The ends of the boss are unevenly disposed relative to the plane of the bar 3, for a purpose which will be seen later.

Reversibly but nonturnably mounted in the socket is one end of a straight handle bar 6, a set screw 7 being mounted in the socket member for engagement with the handle, to prevent too ready removal of the latter.

Slidably but nonturnably mounted on the handle bar outwardly of the socket member is a sleeve 8, held in any desired position on said bar by means of a set screw 9 mounted in the sleeve and engageable with any of a number of longitudinally spaced holes 10 in the bar. Ears or lugs 11 project from one side of the sleeve, between which is mounted a roller 12, the axis of which is substantially parallel to that of the orifice 5.

Ears 13 project from the opposite side of the sleeve, these being disposed substantially at right angles to the ears 11 and having journaled therebetween a roller 14 whose axis is in a plane at right angles to that of the orifice 5 and is in radial alinement therewith. The under periphery of the roller 14 is further removed from the plane of the adjacent face of the sleeve than is the correspondingly disposed flat face of the roller 12, for the purpose which will be evident hereinafter.

The tool is intended to be operated in connection with the rim-carrier 15 mounted at the rear of nearly all cars, such carriers being commonly provided with a diametrically and horizontally disposed bar 16, in the center of which, that is concentric with the rim, we mount a fixed and outwardly projecting pin or stud 17 of a size to have a neat turning fit in the orifice 5. If this bar is lacking, we provide one to suit, or if it is not centrally disposed, it is of course an easy matter to add plate means thereto to enable the pin to be mounted in the proper position.

In operation, the tire 18 is first initially mounted in its rim 19 in the usual manner, that is with the valve stem 20 and the beads 21 of the tire adjacent said stem in place in the curled edges or holding means 22 of the rim.

The remainder of the tire, on both sides of the seated or clinched portion, will of course hang in a plane offset from or at an angle to that of the rim, as will be understood. The rim, with the tire projecting outwardly therefrom, is then mounted on the carrier, with the valve stem at the top, as is customary.

The tool is then mounted in position with the orifice 5 about the pin 17, which forms the pivot for a turning movement of the device.

The face of the sleeve 8 is adjacent the outer side edge of the rim (which is that face beyond which the periphery of the roller 14 projects) and the corresponding edges of the members 11 and 12 are in continuous straight alinement to form a firm bearing surface to rest against the rim, as shown in Fig. 3. In this position, the handle bar is turned in that direction which will make the roller 12 the leading, and the roller 14 the following, rollers. The distance from the pin 17 to the farther edge of the roller 12 is greater than the radius of the rim, so that said roller bears against the bead of the tire which projects outwardly of the rim, and holds said bead clear and outwardly of said rim. The follower roller 14 rides on the portion of the bead thus held clear of the rim, and with the rotation of the device about its pivotal pin, causes the bead to be depressed so as to be just inwardly of the inner edge of the adjacent curled edge 22 of the rim, thus permitting the bead to spring into place in the rim-curl.

The necessary pressure must be exerted on the handle bar not only to turn the same but also to cause the sleeve to bear against the rim to maintain the rollers in their proper positions relative thereto. If this is done, the rollers will properly engage the tire bead, and the tire may be quickly caused to be fitted into the rim all around the same. The rollers of course act directly only on the adjacent bead of the tire, but this bead, bearing against the opposite bead, forces the latter into engagement with the opposite edge of the rim simultaneously, as will be evident.

The successful operation of the tool of course depends on a short portion of the tire being already seated in the rim, but as this is always done in any event, this does not detract in any way from the usefulness of the tool.

By having the boss 4 non-centrally disposed relative to the bar 3 and socket member 1, and by having said member reversible relative to the handle and roller members, the device may be used with equal facility regardless of whether the cross bar 16 is disposed at the front or back of the carrier 15. The hinge is provided for the purpose of enabling the handle and roller members to be moved relative to the rim without disturbing the axial boss, and gives a desired flexibility of action to the structure without any bending strain being placed on the pin 17.

The sleeve 8 being slidable along the handle bar, the rollers may easily be positioned to operate on tires of different diameters.

From the foregoing description it will be readily seen that we have produced such a device as substantially fulfills the objects of the invention as set forth herein.

While this specification sets forth in detail the present and preferred construction of the device, still in practice such deviations from such details may be resorted to as do not form a departure from the spirit of the invention, as defined by the appended claims.

Having thus described our invention what we claim as new and useful and desire to secure by Letters Patent is:

1. A tool for mounting a tire onto its rim, including a bar member adapted to be rotated about an axis concentric with the rim, means mounted on said bar for engaging and causing a bead of the tire to seat in the rim with the rotation of the bar, and a bored boss mounted with the bar at the axial end thereof, the axis of said boss being at right angles to the longitudinal plane of the bar and the opposite ends of said boss being at different distances from the adjacent faces of the bar, the bead engaging members being reversible in position relative to the boss.

2. A tool for mounting a tire onto its rim, including a bar member adapted to be rotated about an axis concentric with the rim, means mounted on said bar for engaging and causing a bead of the tire to seat in the rim with the rotation of the bar, a socket member in which one end of the bar is nonturnably but reversibly mounted, and a bored boss to fit over an axial pin, mounted on the free end of the socket member.

In testimony whereof we affix our signatures.

ION DICKEY.
WILLIAM E. McCOWN.